March 9, 1965     T. W. BURD     3,172,323
AUTOMATIC FEED CONTROL DEVICE
Filed July 10, 1963     6 Sheets-Sheet 1

INVENTOR
THOMAS W. BURD
ATTORNEY

March 9, 1965 T. W. BURD 3,172,323
AUTOMATIC FEED CONTROL DEVICE
Filed July 10, 1963 6 Sheets-Sheet 2
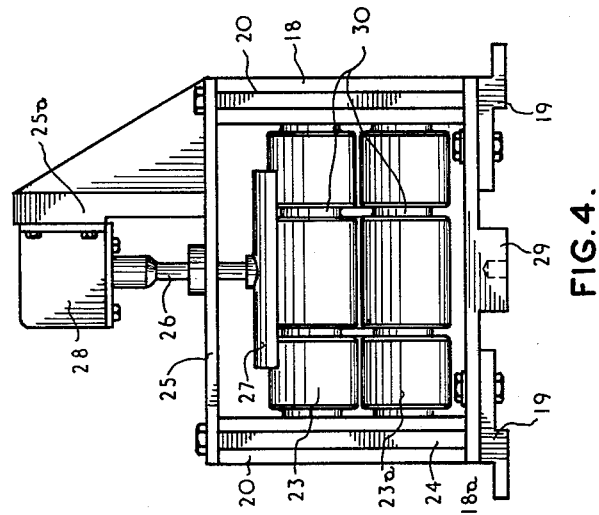
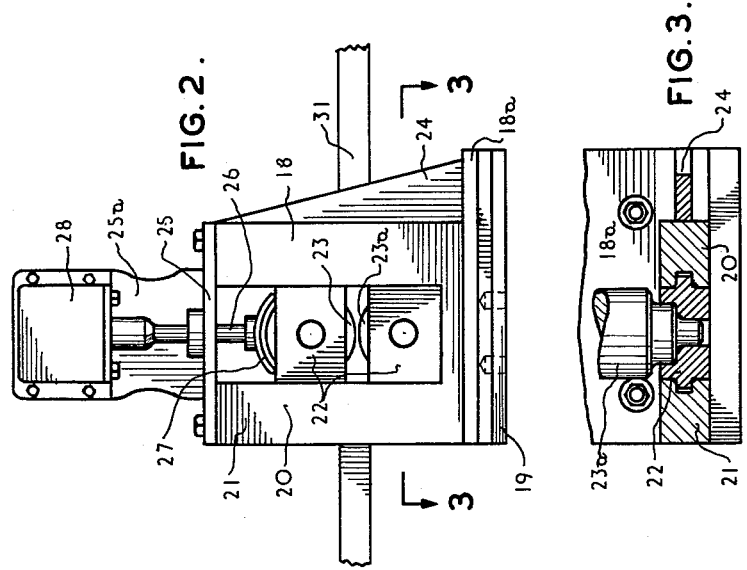
INVENTOR
THOMAS W. BURD
ATTORNEY March 9, 1965 T. W. BURD 3,172,323
AUTOMATIC FEED CONTROL DEVICE
Filed July 10, 1963 6 Sheets-Sheet 3

INVENTOR
THOMAS W. BURD
ATTORNEY

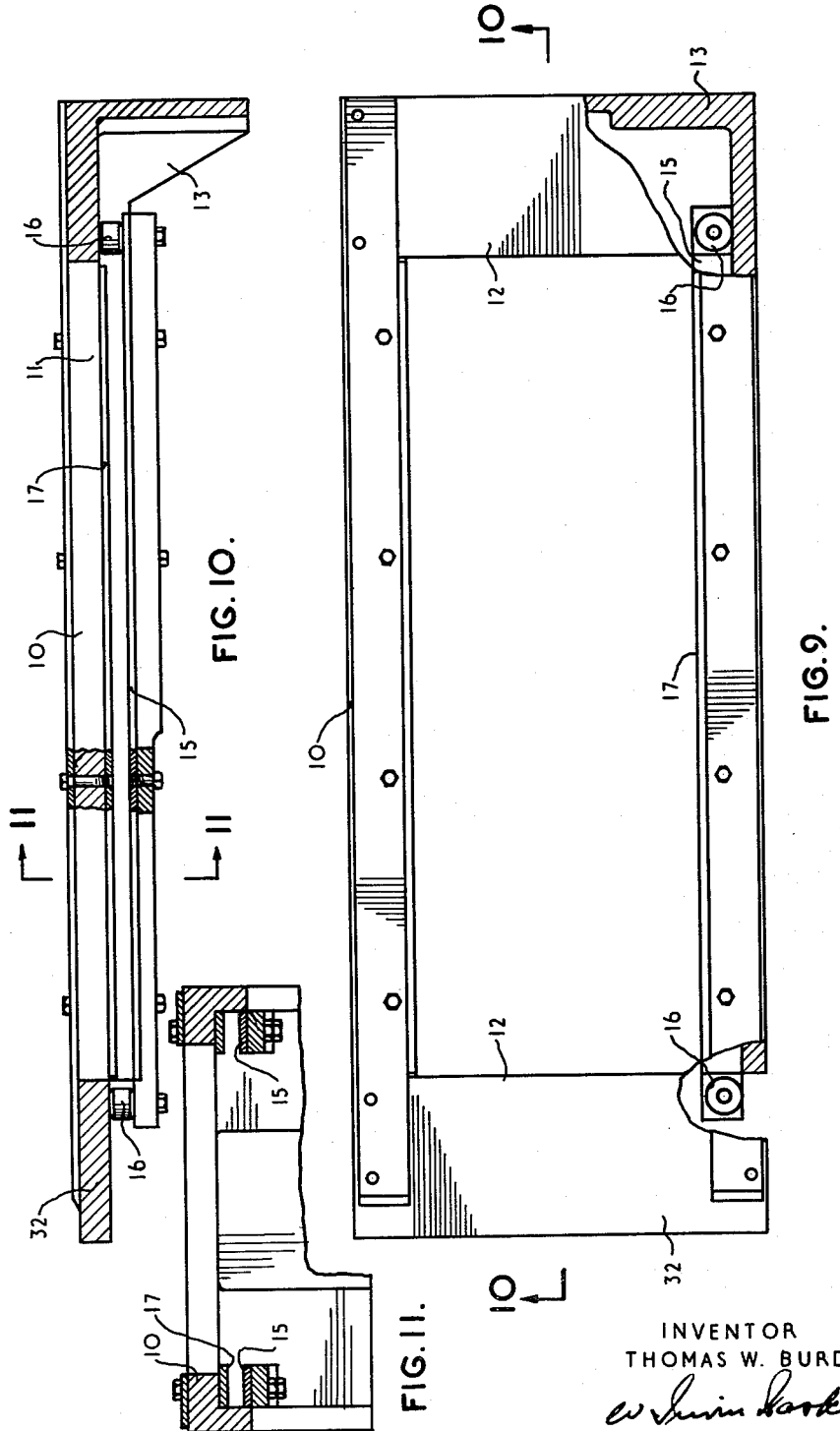

March 9, 1965 T. W. BURD 3,172,323
AUTOMATIC FEED CONTROL DEVICE
Filed July 10, 1963 6 Sheets-Sheet 5
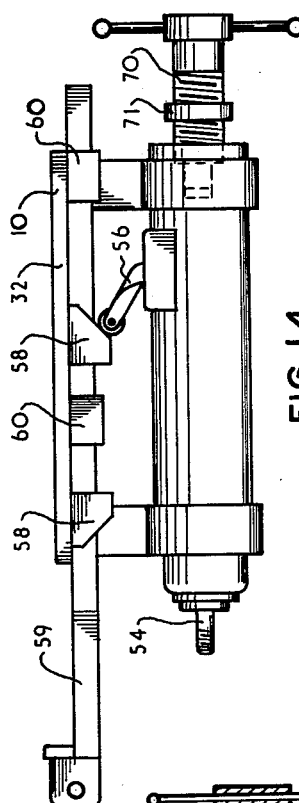
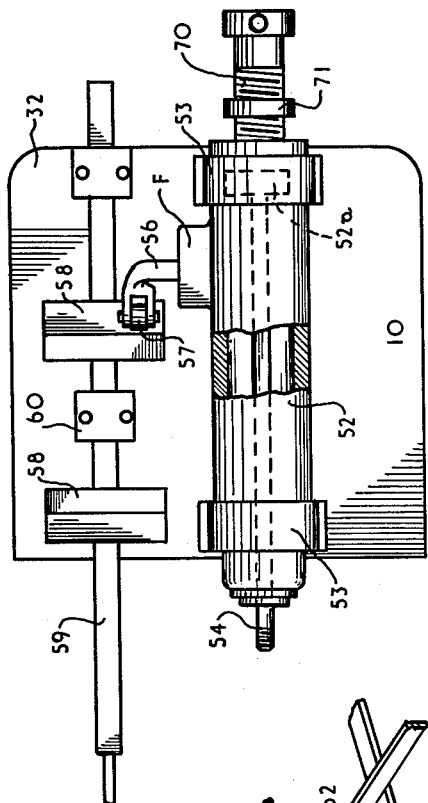
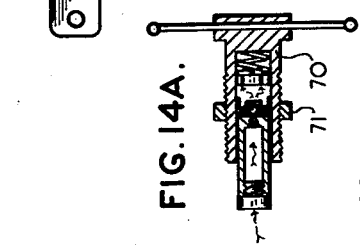
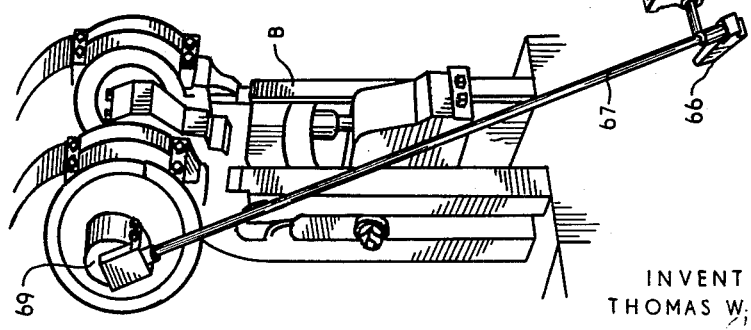
INVENTOR
THOMAS W. BURD
ATTORNEY

INVENTOR
THOMAS W. BURD
ATTORNEY

United States Patent Office 3,172,323
Patented Mar. 9, 1965

3,172,323
AUTOMATIC FEED CONTROL DEVICE
Thomas W. Burd, Mackay Park, 225 Olive St., Apt. 4,
North Bay, Nipissing, Ontario, Canada
Filed July 10, 1963, Ser. No. 294,015
10 Claims. (Cl. 83—225)

This invention relates to an automatic feed control device whereby stock material in strip or similar form is fed to a processing machine. The feeding of stock material in such form to a processing machine, for instance a punch and/or shearing press, or other like machine is often manually controlled, and when stock material is to be punched or cut the press must be momentarily stopped to permit of the stock material being properly positioned relatively to the cutting tool of the press by means of which tool the processing of the work piece is to be carried out.

The delays so occasioned amount in the aggregate to a loss of many work hours compiled from hours lost in the operation of the machine and the loss of productive time of the operator of the machine, so that the efficiency of both the machine and the operator are low.

Attempts have been made to improve the efficiency of presses and like machines utilized in the processing of work pieces of stock materials, but these attempts have been far from successful.

Factories of today usually have available motive power in the form of pneumatic pressure, hydraulic pressure, and/or electricity, and in solving the above problem it was necessary to construct an automatic feed device so that it could be actuated or operated by anyone of these power media.

One of the objects of the invention is to construct an automatic feed control device whereby stock material in strip or like form may be fed to a punch or shear press in regulated intermittent steps, and to synchronize the operation of the feed control with the punch or cutting tool movement so that the reciprocating operation of the press and the feed device is continuous.

Another object of the invention is to provide a reciprocating carriage to positively and automatically feed work pieces to a punch press at regulated intervals between consecutive punching operations and to automatically hold the work piece static between feeding intervals.

A further object of the invention is to adjust the length of the reciprocating stroke of the feed device in accordance with the length of the work pieces being processed by the press, and also in harmony with any adjustment that may be made in the effective stroke of the processing tools carried by the press.

Another object of the invention is to construct a feed device so that the feeding of stock material to a press will be accomplished during the retracting or disengagement of the processing tool from the work piece and to provide a clamping device for the anchoring or securing the stock material against movement during the engagement of the work tool with the work piece.

A further object still of the invention is to construct the feeding device so that it may be readily attached to existing punch or shear presses or the like machines whereby the efficient operation of such existing machines may be greatly increased.

Still a further object of the invention is to control the feeding of stock material in alignment with the processing tool of the press and to eliminate any possibility of misalignment of the stock material during such feeding operation and to eliminate any possibility of buckling or distortion of the stock material at all times during the operation of the feed control device.

Another object of the invention is to construct a feed control device so that the various movable and operating parts may be readily accessible for inspection and repair.

Further objects of the invention will be made clear as the specification develops.

So that the nature of the invention will be clearly understood an embodiment is illustrated which shall be described in detail, but it is to be understood that the invention is not limited to this specific form but the construction may be modified within the scope of the appended claims without departing from the spirit of the invention.

In the drawings:

FIGURE 2 is a side elevation of the feed carriage;

FIGURE 3 is a fragmentary sectional view of one of the arms and a bearing of the lower roller carried by the carriage and taken on the line 3—3 of FIGURE 2;

FIGURE 4 is a rear or end view of the carriage showing the rollers and clamp;

FIGURE 9 is a plan view of the base on which the carriage is adapted to be reciprocally mounted;

FIGURE 10 is a sectional elevation of the base of the feed control device taken on the line 10—10 of FIGURE 9;

FIGURE 11 is a transverse section of the base taken on the line 11—11 of FIGURE 10;

FIGURE 12 is a fragmentary perspective view of part of the punch press showing a drive means from the shaft of the punch press to a rocking arm which actuates the pressure valves of the cylinder;

FIGURE 13 is an enlarged view of the cylinder looking upwardly mounted on the under face of the frame and showing the rod carrying the cams for actuating the pressure valve on the cylinder;

FIGURE 14 is a side elevation showing the cylinder depending from the frame and a roller co-acting with a wedge shaped cam;

FIGURE 14A is a sectional detail of the pneumatic cushion in the adjusting screw.

Like characters of reference refer to like parts in the several figures of the drawings.

Figure 1:
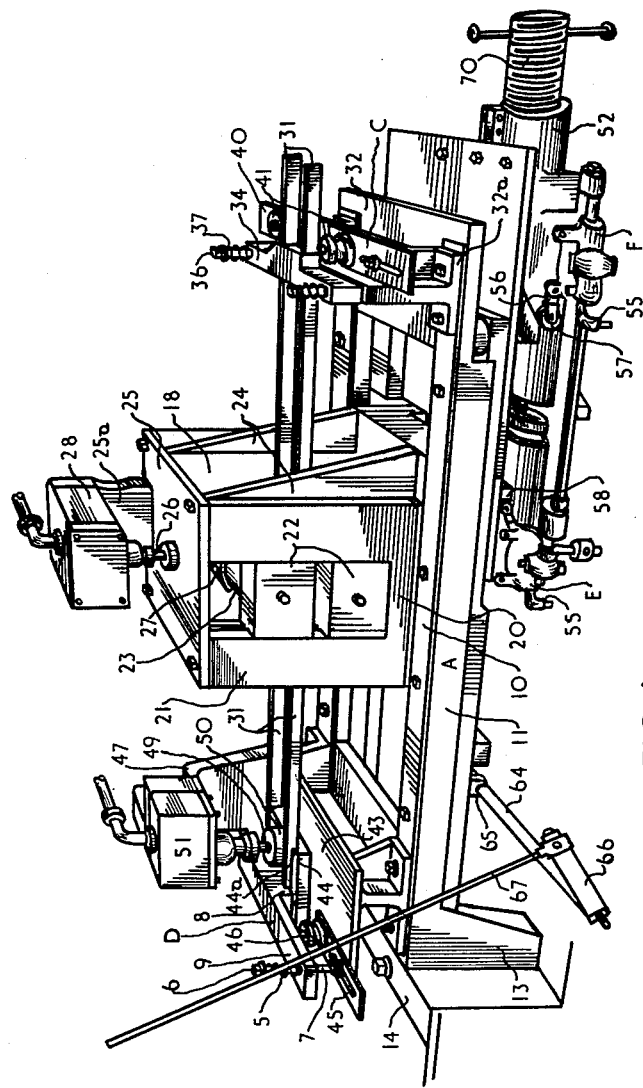
FIGURE 1 is a perspective view of the feed control device.
Figure 8:
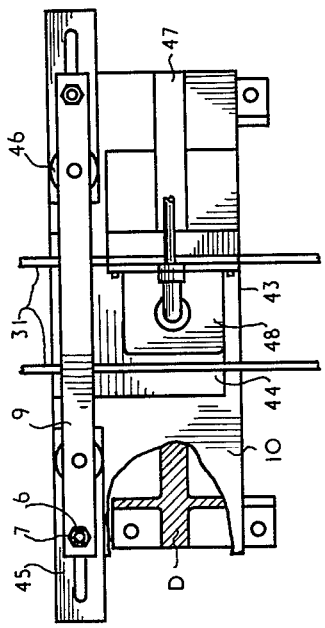
FIGURE 8 is a plan view of the bracket shown in FIGURE 7.
Figure 7:
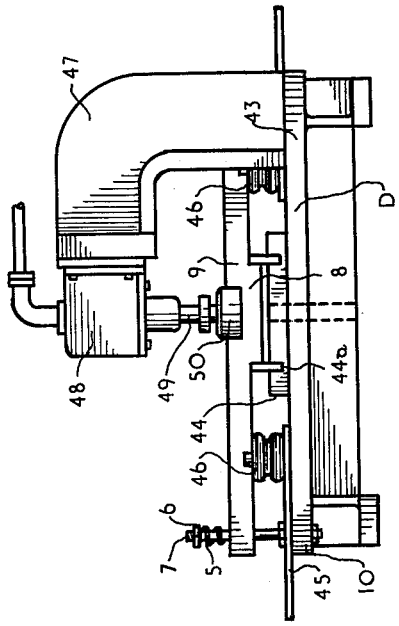
FIGURE 7 is an elevation of a bracket mounted on the front end of the base of the feed control device.
Figure 6:
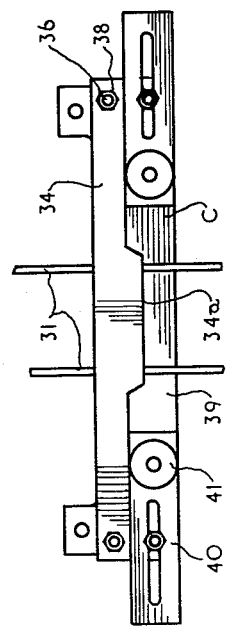
FIGURE 6 is a plan view of the bracket shown in FIGURE 5.
Figure 5:
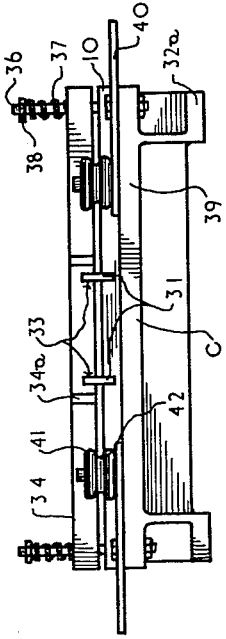
FIGURE 5 is an end view of a bracket designed to be mounted on the rear end of the base of the control device.

Referring to the drawings, A represents a feed device, and 10 the skeleton base thereof which is formed of rectangular shape having side walls 11 and end walls 12, one end wall being provided with webs 13 giving rigidity to the base, and these webs 13 abut and are rigidly connected to a bracket 14 by means of which the base 10 may be bolted or otherwise rigidly connected to a punch or shear press B.

A pair of longitudinally disposed guide bars 15 preferably formed of hard steel are bolted to the frame but are spaced therefrom by hard steel washers 16 and a second pair of guide bars 17 are secured to the base 10 by bolts or other suitable means, and each pair of guide bars 15 and 17 are spaced apart to form slides which are located opposite each other.

Mounted on the base 10 is a carriage 18 which is formed of a casing, on the lower end of which a pair of approximately Z-shaped guides 19 are adjustably mounted, and one arm of each of these guides projects laterally beyond the side walls of the carriage 18 to slidably engage an adjacent slide located between the guides 15 and 17 so that the carriage 18 may be reciprocated lengthwise of the base 10 in a manner to be explained hereafter.

The carriage 18 is formed with spaced vertically disposed lateral walls 20 which are bifurcated forming two arms 21 between which the bearings 22 are slidably mounted. These bearings 22 rotatably support spindles carrying rollers 23 and 23ª which extend transversely across the carriage and are located between the walls 20.

The lateral walls 20 are braced by parallel ribs 24 which extend rearwardly of the lateral wall, and the top of the carriage is closed by a cover plate 25 having an orifice in the centre thereof, and through this orifice a spindle or piston rod 26 slidably extends. The lower end of this spindle or piston rod carries an arcuate clamping member 27 which co-acts with the upper portion of the peripheral wall of the roller 23. This spindle or rod 26 may constitute the spindle of a fluid pressure piston control valve 28 which is of conventional construction so that the valve need not be described in structural detail, or may be connected to the armature of a solenoid mounted above the cover plate 25 on the bracket 25ª carried by the carriage 18 as will be explained hereafter. It will thus be clear that the arcuate clamping member 27 may be actuated by a fluid pressure control valve or an electrically controlled solenoid.

The lower wall 18ª of the carriage 18 is formed with a downwardly extending lug 29 to which one end of a piston rod 42 may be attached if the carriage 18 is actuated by a fluid pressure controlled cylinder such as is indicated at 52.

The two rollers 23 and 23ª are provided intermediate of their length with two encircling grooves 30 which are spaced equidistantly from the central transverse axis of the rollers, and a pair of spaced parallel guide rods 31 engage the grooves 30 and extend longitudinally of the carriage 18 where they are supported from the base 10 by brackets C and D to which the rods are anchored.

The bracket C has transverse arms 32ª bolted to the apron 32 of the base 10, and in the upper face of a vertical arm of this bracket a pair of grooves 33 are provided with which the parallel guide rods 31 engage.

A cover 34 is provided for the bracket C formed with a central projecting portion 34ª and the cover and projection are formed with slots with which the parallel guide rods 31 engage. The cover is vertically displaceable being slidably mounted on the guide studs 36, the lower ends of which are secured to the base 10, and each stud 36 is encircled by a compression spring 37 located between the nut 38 and the upper face of the cover 34, so that this cover is yieldable or floating.

A piece of stock material being processed, if of strip or narrow width, will lie between the guide rods 31 and underlie the cover 34 and so maintain the work piece in proper alignment with the punch or tool of the press B during a processing operation, but if the stock material is relatively wide then other guide members may be required, and to this end a transversely extending flange 39 is formed on the vertical member of the bracket C, and on this flange a pair of slotted projecting plates 40 are adjustably mounted. On the inner end of each of these slotted plates an annular guide member 41 is pivotally mounted.

Each annular guide member 41 is formed with a peripheral groove 42 adapted to co-act with the lateral edges of relatively wide stock material being processed, and these annular guides 41 are adjusted to the width of the stock and maintain the sheet or ribbon or stock material in proper alignment with the processing tool of the punch press and the strip of stock will underlie the cover 34 of the bracket C and this will also prevent the sheet or ribbon being distorted or buckled.

The bracket D on the rear end of the base 10 is bolted to the upper face of the base 10 and is formed with a platform 43 provided with an upwardly disposed rectangular projection 44 formed with grooves 44ª which engage the guide rods 31, and on this platform 43 and adjacent the sides thereof are mounted a pair of oppositely disposed adjustable slotted plates 45 which carry annular pivotally mounted guides 46 each having a peripheral groove similar in construction to the annular guides 41 on the bracket C located at the front of the base 10. These plates 45 may be adjusted to permit the guides 46 to co-act with the edges of relatively wide strip material being fed to the punch press B for processing.

A cover 9 is provided for the bracket D, and this cover has a downwardly disposed projection 8 which fits between the guide rods 31, and the ends of the cover slidably engage the studs 7 which are secured at their lower ends to the frame 10. The upper ends of the studs 7 are provided with nuts 6, and compression springs 5 encircle the studs 7 and are located betwen the cover and the nuts. This cover is thus yieldable or floating.

An upwardly disposed bracket 47 is located at one side of the bracket D, and the upper end of this bracket is offset and overhangs one end of the bracket D, and on this overhanging end of the bracket 47 a fluid pressure piston type member 48 is operatively supported. This clamping member has a spindle 49, on the lower end of which is a disc shaped clamp 50 which is located between the parallel guide rods 31, and the upper end of the spindle 49 may be connected to a fluid pressure piston valve 51, or it may be connected with the armature of a solenoid whichever form of actuating device is employed. This clamp 50 engages the work piece only during the retractive stroke of reciprocation of the carriage 18 and holds the work piece static during the period before which the rollers 23 and 23ª re-engage the work piece to feed it forwardly to the punch press.

The means for reciprocating the carriage 18 as illustrated in FIGURES 1, 13 and 14, is a pressure cylinder 52 which is secured to the base 10 by clamps 53 or other suitable means, and in this cylinder 52 a piston 52ª is mounted, and the piston rod 54 extends through one end of the cylinder and is connected to the lug 29 on the lower wall of the carriage 18, so that as the piston reciprocates within the cylinder 52 the piston rod 54 will move the carriage 18 back and forth in the slides formed by the guides 15 and 17.

As illustrated in FIGURE 1, two valves E and F are shown located at opposite ends of the cylinder 52, and these valves E and F are of conventional design and will not be described in detail, but each valve is provided with an inlet port communicating with the end of the cylinder to which the valve is adjacent. The valves are also formed with bleed ports and each valve is connected by a conduit 55 to a source of fluid under pressure. The opening and closing of the valves E and F are controlled by levers 56, on the ends of which are rollers 57, and these rollers co-act with wedge-shaped cams 58 in the following manner.

The wedge-shaped cams 58 are adjustably secured to a rod 59 (see FIGURES 13 and 14), which is slidably mounted in bearings 60 secured to the under side of the apron 32 of the base 10. This rod 59 is shown in FIGURE 10 and is reciprocated by a transverse rod 61 which is connected to a longitudinally disposed rod 62 supported below the apron 32 of the base, and that end of the rod 62 adjacent the rear end of the base 10 is pivotally attached to a rocking arm 63 which projects radially from the transverse rocking shaft or spindle 64.

The two ends of this spindle or shaft 64 are mounted in bearings 65 carried by the base 10, and one end of the spindle 64 projects beyond the base 10, and a crank arm 66 is attached to the projecting end of the spindle by means of a pin or key. The outer end of the crank arm 66 is pivotally attached to the lower end of actuating rod 67 the upper end of which is operatively connected to the drive shaft 68 of the punch press B.

This connection between the rod 67 and the shaft of the press is illustrated in FIGURE 12 in which a cap 69 fits over the end of the shaft and is eccentrically attached to the shaft so that on rotation of the shaft rod 67 is reciprocated longitudinally transmitting a rocking motion to the rocking shaft 64 which in turn through the rocking arm 63 and rods 62 and 61 transmit reciprocating motion to the rod 59 (see FIGURES 13 and 14). In this way the motion of the rod 59 is synchronized with the rotation of the drive shaft of the punch press B.

The engagement of the wedge shaped cams 58 with the roller 57 on the levers 56 will control the alternate opening and closing of the valves E and F. Only one valve F is illustrated in FIGURES 13 and 14 for the sake of clarity. When the valve E shown in FIGURE 1 is opened fluid pressure is delivered to the cylinder 52, then the valve F, shown in FIGURE 1, will be closed but will be in a position to bleed fluid pressure from its adjacent end of the cylinder 52, so that there is no appreciable back pressure on the piston 52$^a$ which is reciprocally mounted in the cylinder 52.

The movement of the piston valves 28 and 48 are operatively controlled by conventional fluid pressure actuated valves similar to the valves E and F previously described but it is not thought necessary to describe or illustrate such valves as it only results in prolixity of the specification.

In the operation of the automatic feed control device, the strip of stock material being processed is fed through the brackets C and D with the strip being located under the floating cover 34 of the bracket C and the floating cover 9 of the bracket D so that stock of different thicknesses can be processed, or should any irregularities appear on the upper or lower faces of the strip of stock, then the floating covers 34 of the bracket C and the cover 9 of the bracket D will automatically adjust themselves to accommodate the strip of stock material being fed to the punch press. During the forward movement of the reciprocating stroke of the carriage 18, the clamping member 50 is disengaged from the strip of stock underlying the clamp, but the arcuate clamping member 27 is in engagement with the roller 23 firmly holding the rollers 23 and 23$^a$ in non-rotatable gripping engagement with the strip of stock material being fed through the machine.

During the rearward movement of the carriage 18, the disc-shaped clamping member 50 is in firm engagement with the strip of stock material holding it firmly in a non movable or static position, while the arcuate clamping member 27 is released from engagement with the roller 23 so permitting the carriage 18 to return to the end of its stroke to reclamp the rollers 23 and 23$^a$ in engagement with the strip of feed material.

The carriage 18 is now in a position to start a fresh feeding stroke, and the clamping member 50 is disengaged from the strip of stock material permitting the carriage 18 to again feed this strip of material towards the punch press B. It will be clear that the feeding of the strip of stock material to the punch press B is a step by step movement in harmony with the operation of the punch press B.

It may be necessary to adjust, within certain limitations, the length of travel of the carriage 18, and for this purpose I provide a micrometer screw 70 which is in engagement with the rear end of the cylinder 52, and this screw is provided with a lock nut 71 which co-acts with the end of the cylinder. This micrometer screw is connected to a movable cylindrical wall (not shown) slidably mounted in the cylinder 52, so that on adjustment of the screw 70 the sliding wall will be positioned as required to increase or decrease the length of travel of the piston in the cylinder 52 to a desired extent which will adjust the length of travel of the carriage 18.

The movable wall in the cylinder 52 is not illustrated but it may take the form of a disc with a peripheral sealing ring or it may take any other desired form, so that the adjustment of the length of travel of the carriage will be within tolerances which this adjustment screw may provide.

Figure 15:
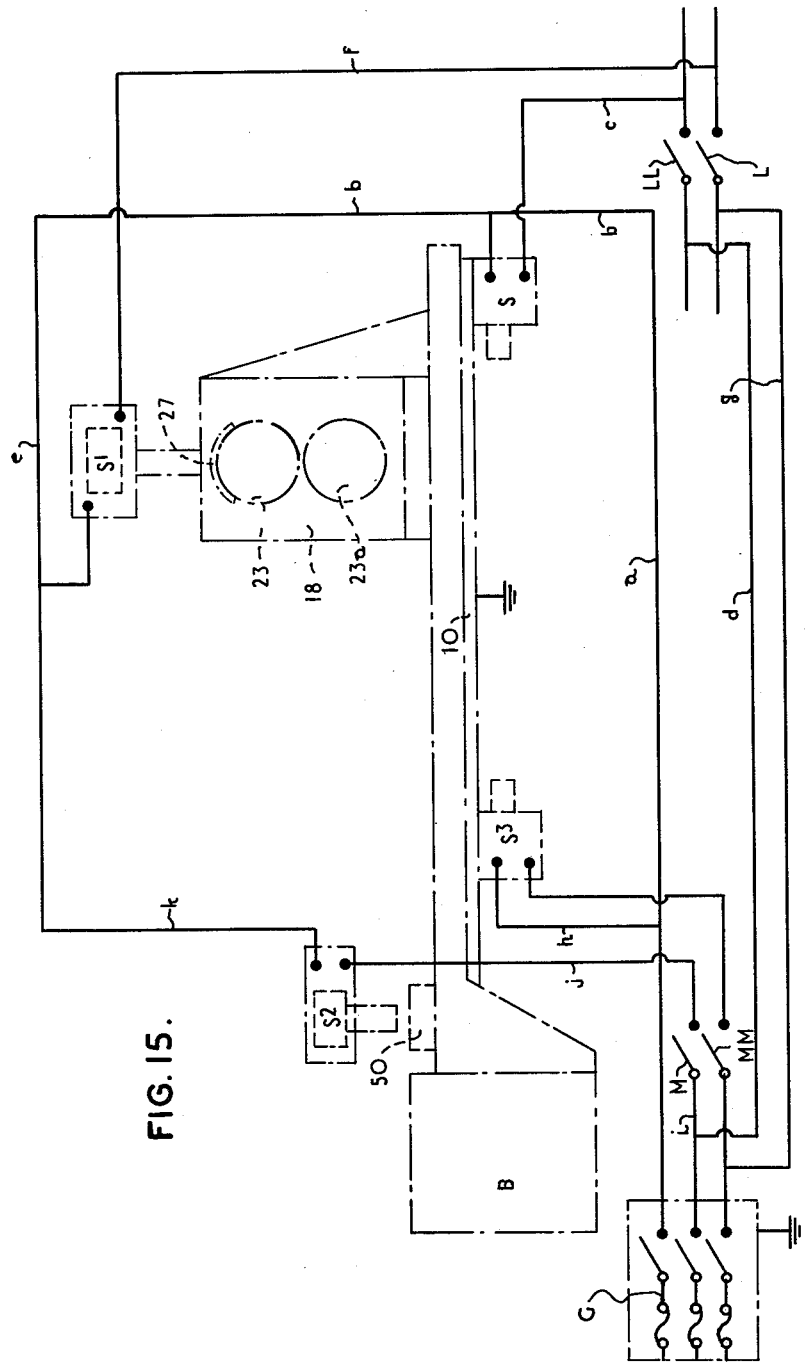
FIGURE 15 is a diagram of an electric circuit used with the feed device when electrically operated.

When my automatic feed device is to be electrically controlled, I preferably use solenoids to control the reciprocation of the carriage 18, and a diagrammatic arrangement of an electric circuit is illustrated in FIGURE 15 to show how these solenoids function, and also how the solenoids control the clamping of the feed stock and the feed rollers of the carriage so that the solenoids may be energized and de-energized as required.

Reference is now made to FIGURE 15 which discloses an electric circuit provided with switches, the operation of which may be controlled by cams. This circuit shows power lines G from a source of electrical energy and these lines have switches enclosed in a casing which is grounded. The power lines are also provided with fuses for safety purposes. These switches may be operated by a master switch of approved form. The base 10 which supports the carriage 18 is also grounded.

The operation of this circuit is as follows:

When the carriage 18 is to be, or is being moved towards the punch press B, the switches L and LL are closed by co-acting cams similar to those disclosed with respect to the fluid pressure control valves previously described, and current flows from the source of electrical energy indicated at G through wire $a$, wire $b$ to solenoid S and then through wire $c$ to the switch LL, wire $d$ to the source of energy G so energizing the solenoid S and exerting a force on the carriage 18 to move the carriage forwardly. Simultaneously current flows from the source of energy G, wire $a$, wire $b$, wire $e$ to the solenoid S$^1$, and thence through the wire $f$, switch L, wire $g$ back to the source of energy G, energizing the solenoid S$^1$ so that the arcuate clamp 27 engages the roller 23 and presses it into close contact with the roller 23$^a$ and so the strip of stock material is clamped between the rollres 23 and 23$^a$ and fed forwardly by and with the carriage 18. It will be clear that the operation of the solenoids S and S$^1$ is synchronized to hold and advance the work piece material the full length of the stroke of the carriage 18.

At the end of the forward stroke of the carriage 18 the switches L and LL are open de-energizing the solenoids S and S$^1$ and the switches M and MM are closed by cam action and current now flows from the source of power G through the wire $i$, switch M, wire $j$, solenoid S$^2$, wire $k$, wire $e$, wire $b$, wire $a$ back to the source of energy G thereby energizing the solenoid S$^2$ and pressing the clamp 50 into contact with the strip of stock material.

Simultaneously current flows from the source of energy G wire $a$, wire $h$, to solenoid S$^3$, wire $l$, switch MM back to the source of energy G thereby energizing the solenoid S$^3$ which transmits a push to the carriage 18 so that the carriage travels to the end of its stroke remote from the punch press B.

The operation of the solenoids S$^2$ and S$^3$ is synchronized to hold the stock material static and return the carriage 18 to reload or reengage the strip of stock material preparatory to starting a new cycle of operation.

The cycles of operation referred to above are repeat cycles so that a controlled step by step feeding of the stock material to the punch press B is carried out without in any way interfering with the normal time cycle of operations of the punch press. This reciprocation of the carriage 18 is timed relatively to the movement of the punch carried by the punch press so that the movement of the carriage 18 is co-related with the punch press operation, and there is no loss of time in the step by step feeding of the strip material to the punch press B. The fact that the feeding of the stock material is automatic increases the efficiency of the punch operation.

What is claimed as new is:

1. For use with a press having a reciprocating cutting tool, a work piece feeding device comprising a frame, slides underlying the frame, a carriage reciprocally mounted on the frame, oppositely disposed adjustable guides on the carriage co-acting with the slides, upper and lower grooved rollers supported by the carriage, the grooves in the two rollers registering, rigidly supported spaced guide members engaging registering grooves in the rollers, an arcuate reciprocable clamp carried by the carriage and co-acting with the upper roller, means for reciprocating the carriage in synchronous relation with the reciprocating cutting tool, and a clamp on one end of the frame co-acting with a work piece to anchor the work piece during a retrograde movement of the carriage.

2. For use with a press having a reciprocating cutting tool, a work piece feeding device comprising a frame, slides depending from the frame, a carriage mounted on the frame, oppositely disposed adjustable guides on the carriage co-acting with the slides, upper and lower grooved rollers supported by the carriage with similarly located grooves of the two rollers registering, spaced guide members engaging registering grooves, means at each end of the frame rigidly maintaining the spaced guide members in parallel static relation, an arcuate reciprocating clamp on the carriage co-acting with the upper roller, means for reciprocating the carriage in synchronized relation with the cutting tool, and a clamp at one end of the frame co-acting with the work piece to retain the work piece static during the retrograde movement of the carriage.

3. For use with a press having a reciprocating cutting tool, a work piece feeding device as claimed in claim 2 in which the means for maintaining the spaced guides in parallel static relation consist of two brackets located at opposite ends of the frame, each bracket being provided with a spring controlled floating cover.

4. For use with a press having a reciprocating cutting tool, a work piece feeding device comprising a rectangular frame formed at one end with an apron, slides depending from the frame, a carriage reciprocally supported by the slides, upper and lower grooved rollers supported by the carriage with similarly located grooves in the two rollers registering, parallel spaced guide members engaging registering grooves in the rollers, an arcuate reciprocable clamp carried by the carriage and co-acting with the upper roller, a bracket on the apron of the frame rigidly supporting the parallel spaced guides, means for reciprocating the carriage in synchronized relation with the cutting tool, and a clamp at the end of the frame remote from the apron co-acting with a work piece to retain the work piece static during the retrograde movement of the carriage.

5. For use with a press having a reciprocating cutting tool, a work piece feeding device comprising a rectangular frame, slides depending from the frame, a carriage on the frame, oppositely disposed guides on the carriage co-acting with the slides, upper and lower grooved rollers supported by the carriage with similarly located grooves in the two rollers registering, parallel spaced guide members engaging registering grooves, an arcuate clamp on the frame co-acting with the upper roller, a bracket on one end of the frame rigidly supporting the parallel guide members, a floating cover for the bracket permitting work pieces of varying thicknesses being fed to the press, and means for reciprocating the carriage in synchronized relation with the reciprocating cutting tool.

6. For use with a press having a reciprocating cutting tool, a work piece feeding device comprising a rectangular frame, slides underlying the frame, a carriage on the frame, oppositely disposed guides on the carriage co-acting with the slides, means for reciprocating the carriage, upper and lower grooved rollers supported by the carriage with similarly located grooves of the two rollers registering, parallel spaced guide members engaging registering grooves in the rollers, an arcuate reciprocable clamp on the carriage co-acting with the upper roller, a bracket at one end of the frame rigidly supporting the parallel guide members, adjustable annular guides mounted on the bracket adjacent the parallel spaced guide members, a spring controlled floating cover on the bracket permitting work pieces of varying thicknesses being fed to the press, a clamp on the other end of the frame remote from the bracket, means for actuating the clamp to engage the work piece during a retrograde movement of the carriage and means for varying the length of travel of the carriage.

7. For use with a press having a reciprocating cutting tool, a work piece feeding device as claimed in claim 6 in which the carriage has a downwardly extending lug, and a fluid pressure cylinder underlies the frame and is supported therefrom, a piston and piston rod reciprocally mounted in the cylinder with the piston rod being connected at its outer end with the downwardly projecting lug on the carriage.

8. For use with a press having a reciprocating cutting tool, a work piece feeding device as claimed in claim 6 in which the means for reciprocating the carriage comprises solenoids at the ends of the frame, alternately energized to impart a reciprocating movement to the carriage.

9. For use with a press having a reciprocating cutting tool, a work piece feeding device as claimed in claim 6 in which the carriage has a downwardly extending lug, and a fluid pressure cylinder underlies the frame and is supported therefrom, a piston and piston rod reciprocally mounted in the cylinder with the piston rod being connected at its outer end with the downwardly projecting lug on the carriage and a pair of valves are mounted on the cylinder, one valve at each end thereof, wedges carried by a rod mounted adjacent the cylinder and means actuated by the press for reciprocating the rod.

10. For use with press having a reciprocating cutting tool, a work piece intermittent feeding device comprising a frame, slides underlying the frame, a carriage on the frame co-acting with the slides, means for reciprocating the carriage, upper and lower grooved rollers supported by the carriage with similarly located grooves of the two rollers registering, parallel spaced guide members engaging registering grooves in the rollers, an arcuate reciprocating clamp on the carriage co-acting with the upper roller, a bracket at one end of the frame rigidly supporting the parallel spaced guide members, a clamp on the other end of the frame remote from the bracket, means for actuating the clamp to engage the work piece during the retrograde movement of the carriage, and means for adjusting the length of travel of the carriage, the arcuate clamp and the work piece engaging clamp being alternately actuated.

References Cited by the Examiner

UNITED STATES PATENTS

| | | | |
|---|---|---|---|
| 643,895 | 2/00 | Gohlke | 83—277 |
| 2,342,049 | 2/44 | Holmbeck | 83—277 |
| 2,379,002 | 6/45 | Haller | 83—277 |
| 2,428,493 | 10/47 | Haller | 83—277 |
| 2,729,879 | 1/56 | Sampson | 83—282 |

ANDREW R. JUHASZ, *Primary Examiner.*

LEON PEAR, *Examiner.*